(12) United States Patent
Walgenbach et al.

(10) Patent No.: US 8,864,510 B2
(45) Date of Patent: Oct. 21, 2014

(54) BOLT FREE ELECTRICAL BUS CONNECTOR

(71) Applicant: Schneider Electric USA, Inc., Palatine, IL (US)

(72) Inventors: Jacob E. Walgenbach, Hendersonville, NC (US); Steven Wayne Dozier, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 3 days.

(21) Appl. No.: 13/665,553

(22) Filed: Oct. 31, 2012

(65) Prior Publication Data

US 2014/0120755 A1   May 1, 2014

(51) Int. Cl.
*H01R 4/60* (2006.01)
(52) U.S. Cl.
USPC .............................................. 439/210
(58) Field of Classification Search
USPC ......... 439/210, 213, 507, 701, 752, 679, 511, 439/512, 287
See application file for complete search history.

(56) References Cited

U.S. PATENT DOCUMENTS

| | | | | |
|---|---|---|---|---|
| 1,917,009 | A * | 7/1933 | Betts et al. | 439/262 |
| 2,274,422 | A * | 2/1942 | Mahoney et al. | 174/73.1 |
| 3,504,100 | A | 3/1970 | Yatabe et al. | 174/88 |
| 3,820,057 | A * | 6/1974 | Joly | 439/213 |
| 3,882,265 | A | 5/1975 | Johnston et al. | 174/88 |
| 4,849,581 | A | 7/1989 | Larkin et al. | 174/88 |
| 5,760,339 | A * | 6/1998 | Faulkner et al. | 174/88 B |
| 6,176,720 | B1 | 1/2001 | Johnson | 439/213 |
| 6,371,788 | B1 * | 4/2002 | Bowling et al. | 439/358 |
| 7,819,681 | B1 | 10/2010 | Rodrigues et al. | 439/213 |
| 8,684,759 | B2 * | 4/2014 | Adachi et al. | 439/262 |

OTHER PUBLICATIONS

"Storage, Installation and Maintenance Instructions for . . . XJ-L Busway System." Siemens. 6 pages (date unknown, assumed to be prior to Sep. 13, 2012).

* cited by examiner

*Primary Examiner* — Neil Abrams
*Assistant Examiner* — Phuongchi T Nguyen
(74) *Attorney, Agent, or Firm* — Locke Lord LLP (57) ABSTRACT

A busway joint pack includes a first latch mechanism having an open position and a closed position and a second latch mechanism having an open position and a closed position. The busway joint pack further includes a first connector plate having a first major surface opposing a second major surface and a second connector plate having a first major surface opposing a second major surface. The second connector plate is spaced from the first connector plate such that the first and the second connector plates are configured to engage phase conductors of busway sections in a clamping fashion when to the first latch mechanism is in the closed position and the second latch mechanism is in the closed position. The busway joint pack lacks a fastener positioned through the center of the first and the second connector plates, but is rather held together by the latch mechanisms.

24 Claims, 5 Drawing Sheets

BOLT FREE ELECTRICAL BUS CONNECTOR

FIELD OF THE INVENTION

The present invention relates generally to electrical distribution equipment and, more particularly, to bolt free electrical bus connectors.

BACKGROUND OF THE INVENTION

A busway system typically includes two or more busway sections, one or more busway joint packs (e.g., electrical bus connectors) for connecting two busway sections together, and may include multiple plug-in units. Each busway section includes one or more phase-conductors and a housing. For example, in a three-phase system, the busway section can include three live phase-conductors or three live phase-conductors and one neutral-conductor, depending on the type of system architecture being employed. If required, various plug-in units or electrical components can be directly connected to one or more plug-in connection sites spaced along the busway sections to draw power. Each busway joint pack is used to physically and electrically connect two busway sections or two sets of busway together.

Busway joint packs typically include a bolt with a nut and pair of washers (e.g., Belleville washers), where the bolt runs through the center and/or the central area of the busway joint pack. The bolt is tightened by, for example, a torque wrench, once the phase-conductors of two sections of busway are properly seated within the busway joint pack. The tightening of the bolt with the pair of washers thereon aids in creating a sufficient physical and electrical connection between the phase-conductors of the busways and the busway joint pack. Overtime, the busway joint pack endures thermal cycling that can cause the nut to become loosened, thereby negatively impacting the physical and/or electrical connection between the busway joint pack and the busways coupled thereto.

Additionally, having the bolt pass through the center and/or central area of the busway joint pack requires central apertures in all components of the busway joint pack, including connector plates that physically contact the phase-conductors. To accommodate for the central apertures (e.g., reduction in cross section) in the connector plates such that a desired amount of current can pass through the busway joint pack, the thickness of the connector plates is increased. Using larger (e.g., thicker) connector plates to accommodate for the central apertures in the connector plates that accommodate the bolt therethrough increases the size and amount of the materials needed to make the busway joint pack. As connector plates are typically made of copper and/or aluminum, more copper or aluminum is needed to make up for the loss of material removed to form the apertures.

Thus, a need exists for an improved apparatus and system. The present disclosure is directed to satisfying one or more of these needs and solving other problems.

SUMMARY OF THE INVENTION

The present disclosure is directed to providing a bolt-free busway joint pack. Instead of coupling the busway joint pack to a pair of busway sections by tightening a fastener (e.g., bolt) positioned through the center of the busway joint pack, the central fastener is removed and replaced with one or more alternative fasteners (e.g., latch mechanism) positioned at one or both sides of the busway joint pack without having to be positioned through connector plates (e.g., conductive plates made of copper and/or aluminum) of the busway joint pack. By removing the fastener from the center of the busway joint pack, the busway joint pack can be made smaller with less material without compromising the thermal performance of the busway joint pack.

Further, the busway joint pack of the present disclosure does not require a torque wrench for installation of the busway joint pack in a busway system, as is necessary to install prior joint packs with central bolt fasteners. Instead, the latch mechanisms are simply closed (e.g., thrown) to install the busway joint pack. Such a simple installation method results in the ability to install the busway joint pack without needing a lot of room around the busway joint pack.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Words of degree, such as "about", "substantially", and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

Figure 1:
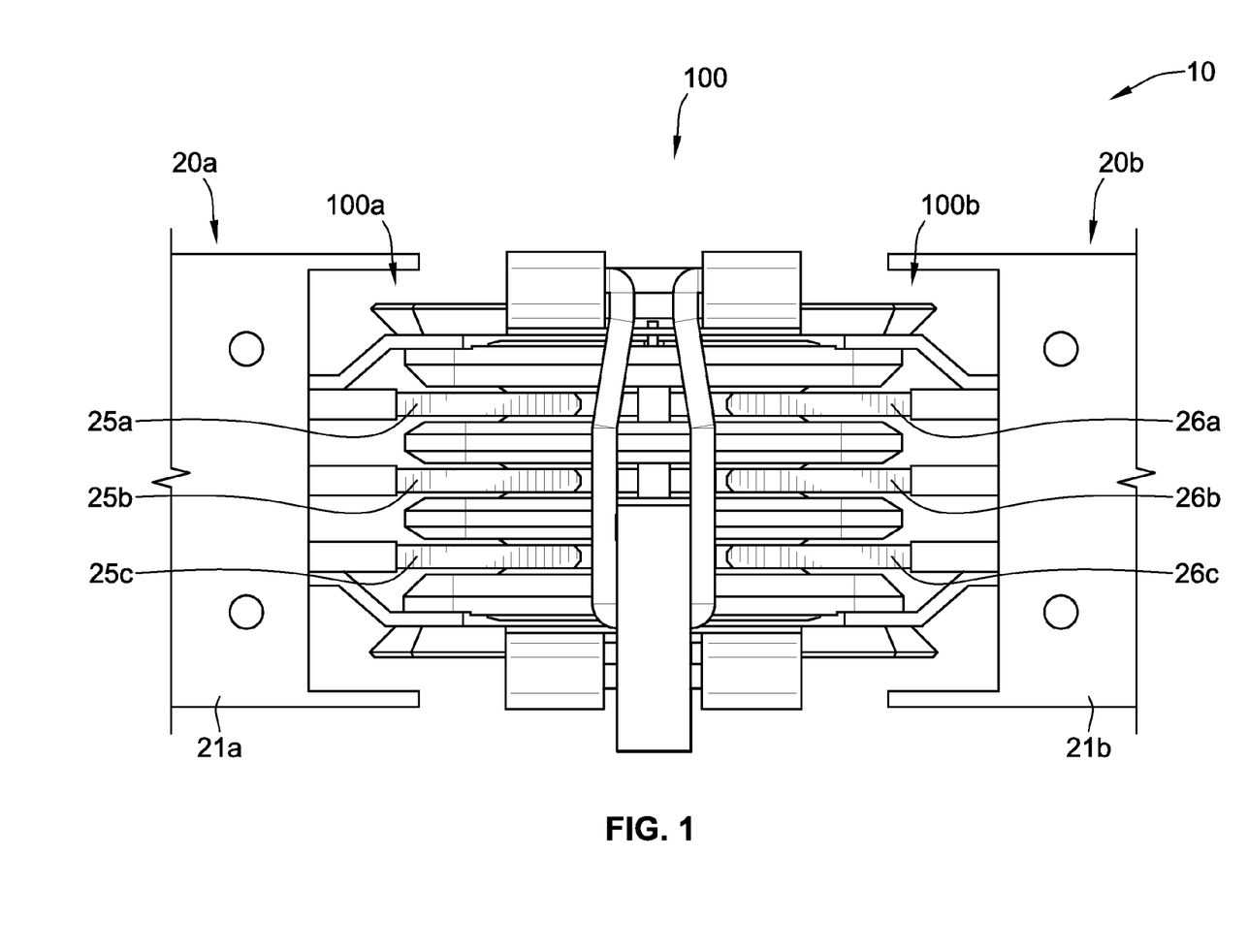
FIG. 1 is a front view of a busway system according to aspects of the present disclosure.

Referring to FIG. 1, a busway system 10 is shown. The busway system 10 includes a busway joint pack or joint pack 100, a first busway section 20a, and a second busway section 20b. The first and the second busway sections 20a,b are three-pole busways and/or three-phase busways. The terms "busway" and "busway joint pack" as used herein have the meanings ascribed to them by persons of ordinary skill in the field of electrical distribution systems. A joint pack can also be referred to as an electrical bus connector. Generally, by the term "busway joint pack" or "joint pack" it is meant to include a collection of components that maintain a coupled relationship therebetween regardless of whether the busway joint pack is installed in a busway system or free floating waiting to be installed in a busway system. By free floating it is meant that the busway joint pack is not installed in a busway system (e.g., not coupled to two busways). By coupled relationship is meant that all of the components of the busway joint pack are coupled directly and/or indirectly to each of the other components of the busway joint pack regardless of whether the busway joint pack is installed or not installed in a busway system.

The first busway section 20a includes a busway housing 21a and three phase-conductors 25a-c. A "phase-conductor" as used herein is an electrically conductive conductor that is capable of carrying electrical current having a phase, which can differ from a corresponding phase of another phase-conductor. Each of the phase-conductors 25a-c is electrically insulated from each other and the housing 21a. Each of the phase-conductors 25a-c have at least one exposed end configured to physically and electrically mate with a first end 100a of the joint pack 100, as shown in FIG. 1. Similarly, the second busway section 20b includes a busway housing 21b and three phase-conductors 26a-c. Each of the phase-conductors 26a-c is electrically insulated from each other and the housing 21b. Each of the phase-conductors 26a-c have at least one exposed end configured to mate with an opposing second end 100b of the joint pack 100 in the same manner as the three phase conductors 25a-c mate with the first end 100a.

The joint pack 100 is configured such that when the first busway section 20a and the second busway section 20b are both physically engaged with the joint pack 100, as shown in FIG. 1, the joint pack 100 electrically couples each of the three phase conductors 25a-c with a respective one of the phase-conductors 26a-c of the second busway section 20b. Specifically, the first phase-conductor 25a of the first busway section 20a is electrically connected with the first phase-conductor 26a of the second busway section 20b; the second phase-conductor 25b of the first busway section 20a is electrically connected with the second phase-conductor 26b of the second busway section 20b; and the third phase-conductor 25c of the first busway section 20a is electrically connected with the third phase-conductor 26c of the second busway section 20b.

Figure 2A:
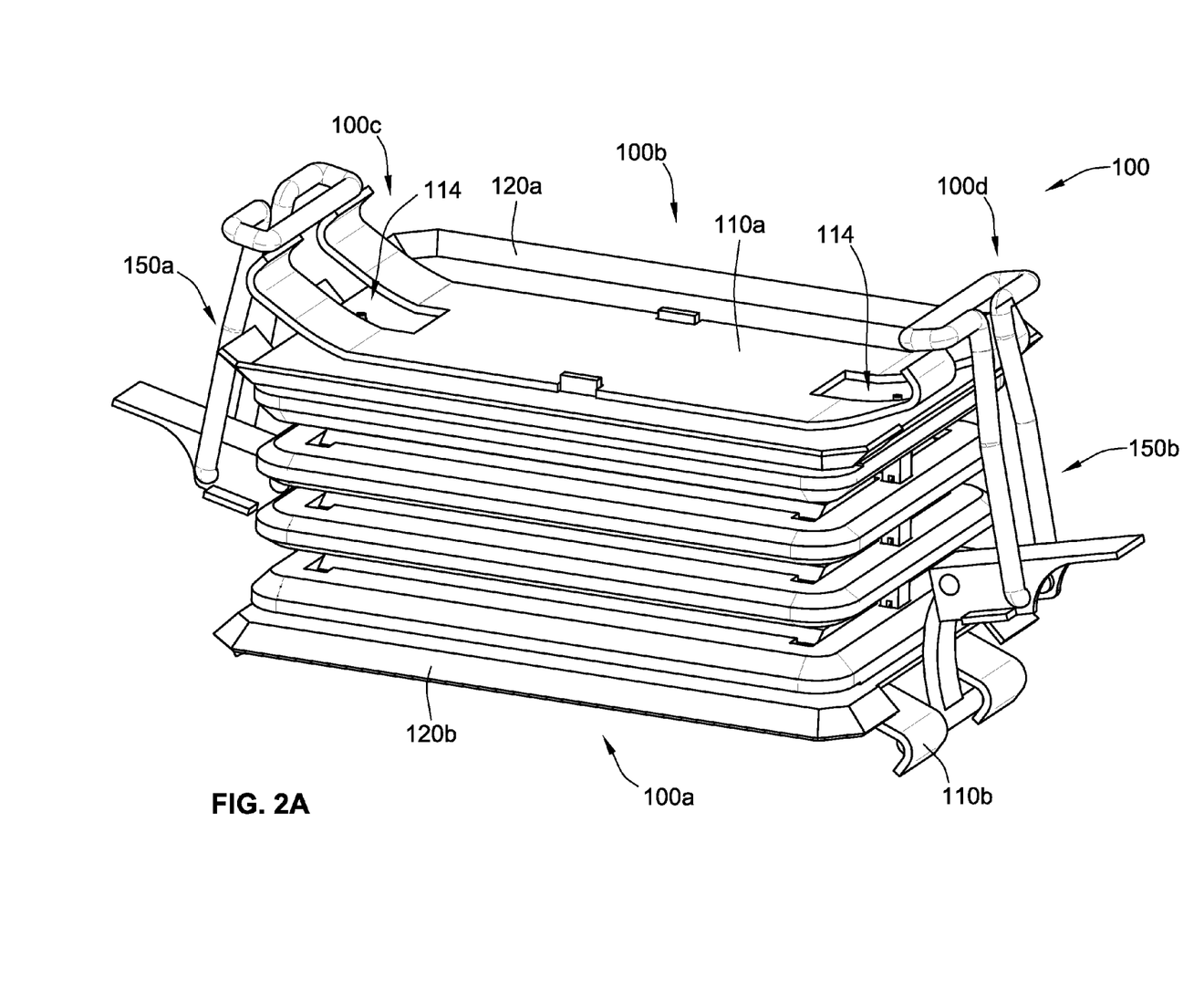
FIG. 2A is a perspective view of a busway joint pack in an open position of the busway system of FIG. 1.
Figure 2B:
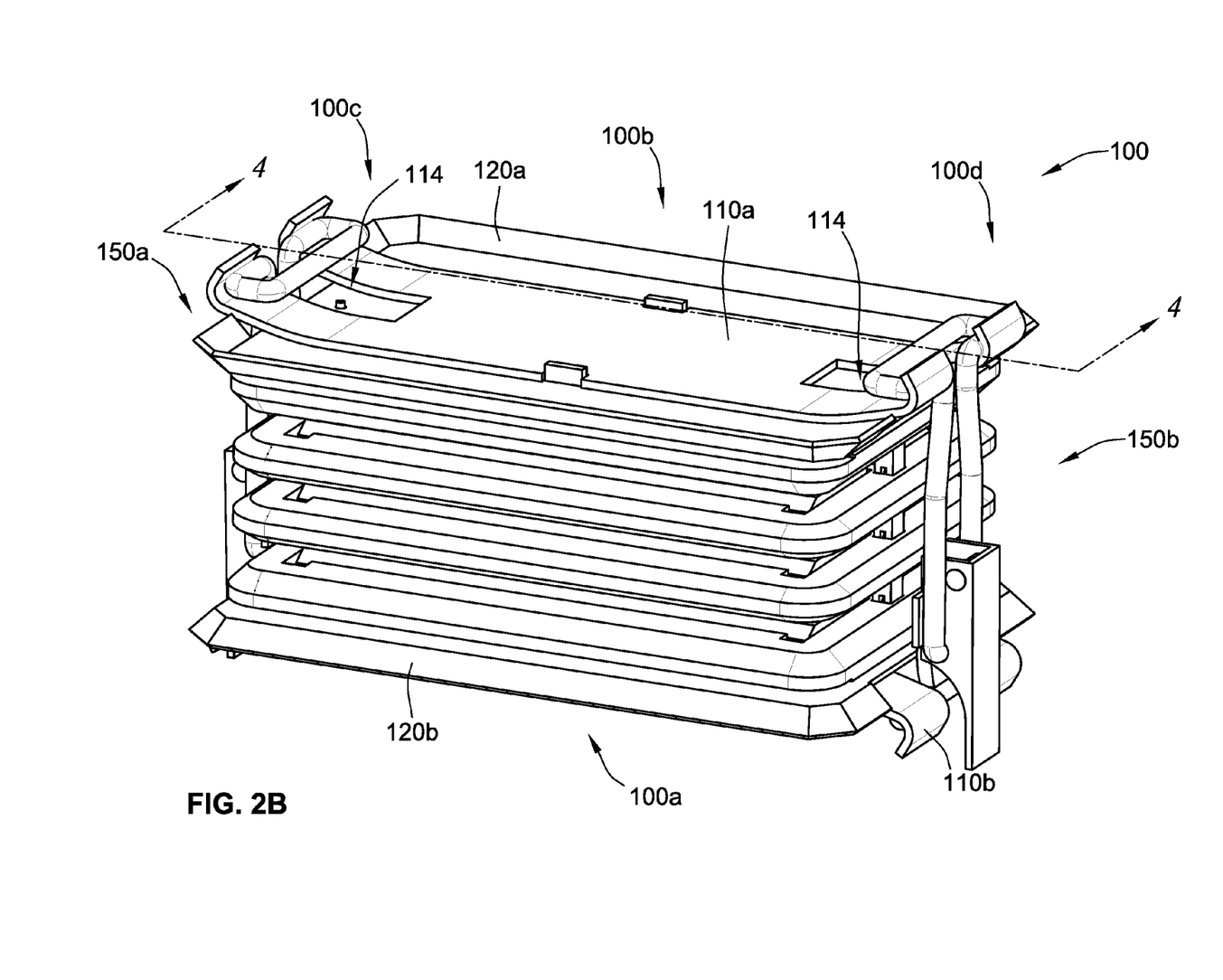
FIG. 2B is a perspective view of the busway joint pack in a closed position.

Referring generally to FIGS. 2A and 2B, the joint pack 100 includes a pair of latch mechanisms 150a,b. The latch mechanisms 150a,b can be any type of latch mechanism, such as, for example, a leveraged latch mechanism, a drawbolt latch mechanism, an over-center lever latch mechanism, etc. Each of the latch mechanisms 150a,b has an open position (FIG. 2A) and a closed position (FIG. 2B). The open position of the latch mechanisms 150a,b (FIG. 2A) corresponds with an open or loosened position of the joint pack 100. Similarly, the closed position of the latch mechanisms 150a,b (FIG. 2B) corresponds with a closed or tightened (e.g., compressed) position of the joint pack 100. The latch mechanisms 150a,b can be actuated (e.g., opened or closed) manually by an operator's hand directly engaging the latch mechanism 150a, b. In some implementations, to gain a better mechanism advantage, a cheater bar or lever (not shown) can be coupled to the latch mechanism 150a,b to aid an operator in closing the latch mechanism 150a,b. A cheater bar or lever may be necessary to close the latch mechanism 150a,b depending on the desired clamping force to be applied by the latch mechanism 150a,b.

When the latch mechanisms 150a,b are in the open position (FIG. 2A), the joint pack 100 is configured to receive the busway sections 20a,b therein. After the busway sections 20a,b are received in the joint pack 100 as shown in FIG. 1, the joint pack 100 can be moved or switched into the closed position (FIG. 2B) by closing the latch mechanisms 150a,b, thereby securely coupling the busway sections 20a,b together such that the phase conductors 25a-c of the first busway section 20a are electrically connected to the respective ones of the phase conductors 26a-c of the second busway section 20b. In some implementations of the joint pack 100, when the busway sections 20a,b are coupled to (e.g., received in) the joint pack 100 and the latch mechanisms 150a,b are in the closed position, the joint pack 100 is configured to engage the phase-conductors 25a-c and 26a-c in a clamping fashion (e.g., pairs of connector plates 160, 170, and 180 clamp onto the phase-conductors) and exert a compressive force (e.g., 5,000 to 10,000 lb-f) on the phase-conductors 25a-c and 26a-c to provide a reliable electrical connection.

Figure 3:
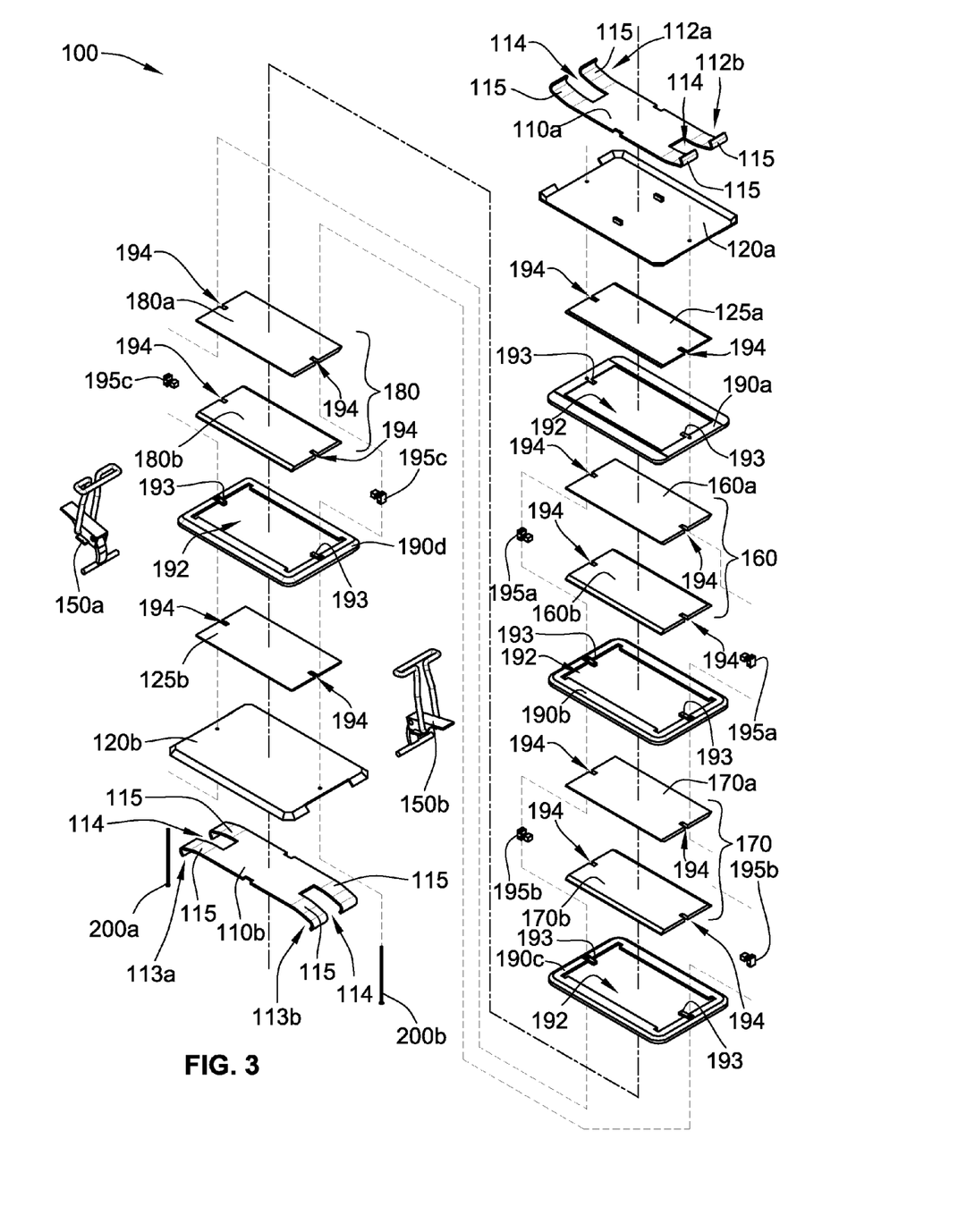
FIG. 3 is an exploded perspective view of the busway joint pack.

The joint pack 100 is generally cube-shaped having the first end 100a, the opposing second end 100b, a first side 100c (FIGS. 2A and 2B), and an opposing second side 100d (FIGS. 2A and 2B). A top of the joint pack 100 is generally defined by an upper pressure plate 110a, and a bottom of the joint pack 100 is generally defined by a lower pressure plate 110b. As best shown in FIG. 3, between the upper and the lower pressure plates 110a,b, the joint pack 100 includes a lid 120a and a base 120b, a pair of grounding plates 125a,b, three pairs of opposing connector plates 160, 170, and 180, and insulating plates 190a-d. Additionally, the joint pack 100 includes the latch mechanisms 150a,b and three pairs of phase spacers 195a-c between the connector plates 160, 170, and 180 and between the insulating plates 190a-d. The three pairs of phase spacers 195a-c are generally held in place by a pair of spacer alignment rods 200a,b (e.g., rivets) (best shown in FIG. 4).

As best shown in FIG. 3, the first pressure plate 110a includes a first latch-engaging portion 112a adjacent to the first side 100c (FIGS. 2A and 2B) of the joint pack 100 and a second latch-engaging portion 112b adjacent to the second side 100d (FIGS. 2A and 2B) of the joint pack 100. Similarly, the second pressure plate 110b includes a first latch-engaging portion 113a adjacent to the first side 100c (FIGS. 2A and 2B) of the joint pack 100 and a second latch-engaging portion 113b adjacent to the second side 100d (FIGS. 2A and 2B) of the joint pack 100. The latch-engaging portions 112a,b and 113a,b are formed by notches 114 in the ends of the pressure plates 110a,b that define fingers 115 on either side of the notch 114. The ends of the fingers 115 can be curled (as shown) to aid in retaining the latch mechanisms 150a,b in engagement with the latch-engaging portions 112a,b and 113a,b of the pressure plates 110a,b.

Specifically, as shown in FIGS. 2A and 2B, the first latch mechanism 150a can be coupled to the first latch-engaging portion 112a of the first pressure plate 110a and the first latch-engaging portion 113a of the second pressure plate 110b. Similarly, the second latch mechanism 150b can be coupled to the second latch-engaging portion 112b of the first pressure plate 110a and the second latch-engaging portion 113b of the second pressure plate 110b. The curled ends of the fingers 115 aid in retaining the latch mechanisms 150a,b as hooked onto the latch-engaging portions 112a,b and 113a,b of the pressure plates 110a,b when the latch mechanisms 150a,b are in the open position (FIG. 2A) and in the closed position (FIG. 2B).

In some implementations, the pressure plates 110a,b are beam springs and/or leaf springs. As such, the pressure plates 110a,b can be deformed (e.g., bent) by, for example, closing the latch mechanisms 150a,b (FIG. 2B), and returned to a non-deformed or resting state (e.g., unbent) when the latch mechanisms 150a,b are opened (FIG. 2A). Further, when the latch mechanisms 150a,b are closed (FIG. 2B) and the pressure plates 110a,b are deformed, the first latch-engaging portion 112a of the first pressure plate 110a and the first latch-engaging portion 113a of the second pressure plate 110b are drawn closer together and the second latch-engaging portion 112*b* of the first pressure plate 110*a* and the second latch-engaging portion 113*b* of the second pressure plate 110*b* are drawn closer together.

The drawing of the latch-engaging portions 112*a,b* and 113*a,b* closer together—as shown in FIG. 2B when the latch mechanisms 150*a,b* are closed—causes the pressure plates 110*a,b* to exert forces on the other components of the joint pack 100. For example, the pressure plates 110*a,b* exert compressive forces on the components therebetween. In the case of the busway sections 20*a,b* being coupled to the joint pack 100 (FIG. 1), the pressure plates 110*a,b* cause the pairs of opposing connector plates 160, 170, and 180 to exert compressive forces (e.g., in a clamping fashion) on the phase-conductors 25*a-c* and 26*a-c*.

Figure 4:
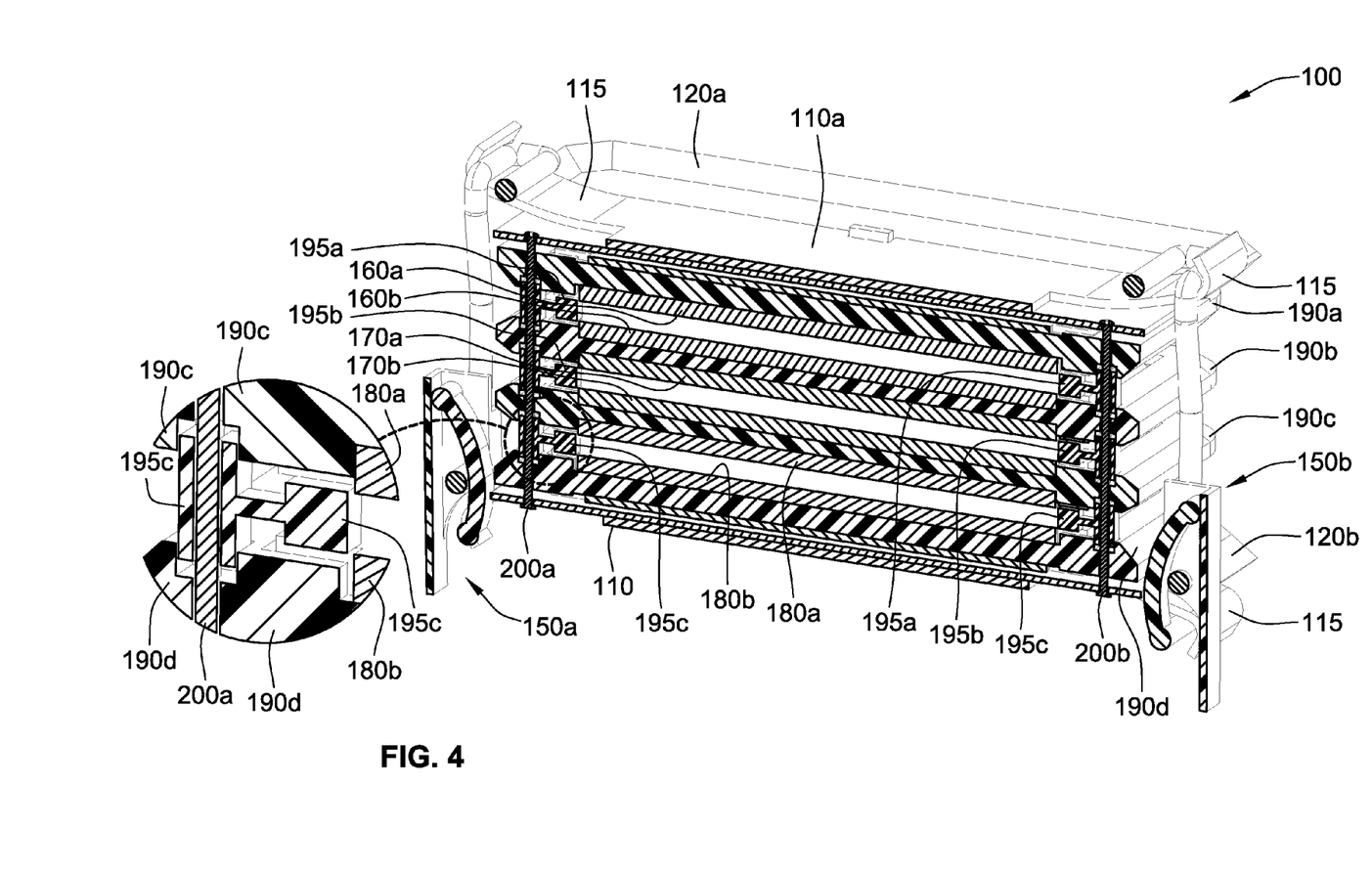
FIG. 4 is a perspective cross-sectional view of the busway joint pack.

Several of the joint pack components are coupled together with the pair of spacer alignment rods 200*a,b* and/or the latch mechanisms 150*a,b*, which is best seen in FIGS. 2B and 4. Specifically, the spacer alignment rods 200*a,b* couple together, in a loose fashion, the joint pack components between the pressure plates 110*a,b*. Thus, when the latch mechanisms 150*a,b* are in the open position, or even completely removed from the joint pack 100, the spacer alignment rods 200*a,b* keep the joint pack components between the pressure plates 110*a,b* from separating. While not shown, in an alternative implementation, the spacer alignment rods 200*a,b* can also keep the pressure plates 110*a,b* coupled to the joint pack 100 (on both sides of the lid 120*a* and the base 120*b*) when the latch mechanisms 150*a,b* are in the open position—or completely removed from the joint pack 100.

While the joint pack 100 is shown as having a certain number, type, and size of components, various other numbers, types, and sizes of components are contemplated. For example, while the joint pack 100 is shown as including the three pairs of opposing connector plates 160, 170, and 180, the joint pack 100 can include any number of pairs of opposing connector plates (e.g., one pair, two pairs, four pairs, etc.). Of course, as the number of pairs of connector plates changes, the number of other joint pack components (e.g., insulating plates, phase spacers, etc.) is modified accordingly. For another example, an alternative joint pack (not shown) can include the upper and lower pressure plates 110*a,b*, the three pairs of opposing connectors plates 160, 170, 180, and the insulating plates 190*a-d* without the other components (e.g., grounding plates 125*a,b*) shown in FIG. 3.

Each of the pairs of opposing connector plates 160, 170, and 180 corresponds to a particular electrical phase of the joint pack 100. The first pair of opposing connector plates 160 corresponds to phase A, the second pair of opposing connector plates 170 corresponds to phase B, and the third pair of opposing connector plates 180 corresponds to phase C of an electrical current (by convention, phases A, B, and C refer to different phases of electrical current, such as 120 degrees apart from one another).

Each of the pairs of opposing connector plates 160, 170, and 180 defines a respective space therebetween for receiving a phase-conductor of a busway, such as one of the phase-conductors 25*a-c*, 26*a-c* shown in FIG. 1. The first pair of opposing connector plates 160 includes a first connector plate 160*a* and a second connector plate 160*b*. Similarly, the second pair of opposing connector plates 170 includes a first connector plate 170*a* and a second connector plate 170*b*, and the third pair of opposing connector plates 180 includes a first connector plate 180*a* and a second connector plate 180*b*.

The connector plates 160*a,b*, 170*a,b*, and 180*a,b* can be made of any electrically conducting material, such as, for example, copper, gold, aluminum, iron, etc. As best shown in FIG. 3, each of the connector plates 160*a,b*, 170*a,b*, and 180*a,b* has a first major surface, an opposing second major surface, a generally constant, rectangular cross-section, and a generally rectangular and substantially planar top profile. Further, none of the connector plates 160*a,b*, 170*a,b*, and 180*a,b* includes an aperture (e.g., a through-going hole or opening) in a central area of the connector plate. Put another way, each of the connector plates 160*a,b*, 170*a,b*, and 180*a,b* lacks an aperture in the central area of the connector plate. Further, the first and the second major surfaces of the first and the second connector plates 160*a,b*, 170*a,b* and 180*a,b* are each continuous (e.g., no breaks, notches, gaps, apertures, etc. in the surface) in the central area of the first and the second connector plates 160*a,b*, 170*a,b* and 180*a,b*. In some implementations, the central area of the first and the second connector plates 160*a,b*, 170*a,b* and 180*a,b* has a constant cross-sectional area. The term "central area" is meant to include an area around the geometric center of the first and the second major surfaces of a connector plate including the geometric center of the connector plate. While the "central area" is larger than the point defined by the geometric center of a major surface of a connector plate, the term is not intended to encompass the entirety of the major surface of the connector plate. The major surface also has edges, sides, and ends, as those terms are understood according to their ordinary and plain meanings, as well as a central area, which does not overlap the edges, sides, or ends of the major surface. The term "central area" is used herein according to its plain and ordinary meaning, noting the subjective variance inherent in the imprecise nature of human language. Without limiting the scope of "central area" to the specific example being provided, the central area in a non-limiting example encompasses an area having no dimension that is larger than about one inch away in any direction from the geometric center of the major surfaces of the connector plate. For another example, without limiting the scope of "central area" to the specific example being provided, the central area in a non-limiting example encompasses an area having no dimension that is larger than about two inches away in any direction from the geometric center of the major surfaces of the connector plate.

The connector plates 160*a,b*, 170*a,b*, and 180*a,b* do not need apertures in their central areas as in prior art joint packs because the joint pack 100 does not use a fastener (e.g., a bolt) through its center to tighten itself in a busway system. Rather, as described herein and shown in the FIGS., the joint pack 100 includes the latch mechanisms 150*a,b* on its sides 100*c,d* to tighten the joint pack 100 or to place the joint pack 100 in its closed or latched position (FIG. 2B). It is the lack of apertures in the central areas of the connector plates 160*a,b*, 170*a,b*, and 180*a,b* that allows the joint pack 100 to include relatively smaller (e.g., thinner) connector plates as compared to prior art joint packs including central bolts. As the connector plates 160*a,b*, 170*a,b*, and 180*a,b* are typically made of copper and/or aluminum, the relatively smaller connector plates 160*a,b*, 170*a,b*, and 180*a,b* can result in the joint pack 100 being relatively less expensive and smaller than the comparable prior art joint pack including the central apertures in the connector plates and the bolt.

The insulating plates 190*a-d* electrically insulate the A, B, and C phases from one another. The first and the second insulating plates 190*a,b* electrically insulate phase A from the other phases (e.g., phase B) and ground (e.g., grounding plate 125*a*). The second and the third insulating plates 190*b,c* electrically insulate phase B from the other phases (e.g., phases A and C). The third and the fourth insulating plates 190*c,d* electrically insulate phase C from the other phases (e.g., phase B) and ground (e.g., grounding plate 125b). Specifically, the second insulating plate 190b is positioned between the second connector plate 160b of phase A and the first connector plate 170a of phase B to electrically insulate the A and B phases from one another. Similarly, the third insulating plate 190c is positioned between the second connector plate 170b of phase B and the first connector plate 180a of phase C to electrically insulate the B and C phases from one another.

As best shown in FIG. 3, each of the insulating plates 190a-d can include a recess 192, on one or both major sides (e.g., top and bottom), for receiving one of the connector plates 160a,b, 170a,b, and 180a,b therein. Further, to aid in preventing the connector plates 160a,b, 170a,b, and 180a,b from moving (e.g., laterally) within the recesses 192 of the insulating plates 190a-d, the insulator plates 190a-d can, in some implementations, include projections 193 that mate with notches 194 formed at opposite ends of each of the connector plates 160a,b, 170a,b, and 180a,b and/or in each of the grounding plates 125a,b as shown in FIG. 3. In the illustrated example, the notches 194 in the connector plates 160a, b, 170a,b, and 180a,b are not apertures in the central areas of the connector plates 160a,b, 170a,b, and 180a,b, but rather are notches 194 in a perimeter or external area (e.g., along the perimeter) of the connector plates 160a,b, 170a,b, and 180a, b.

The insulating plates 190a-d can be made of any electrically insulating material, such as, for example, plastic, rubber, MYLAR® (biaxially-oriented polyethylene terephthalate), polyvinyl chloride (PVC), bulk molded compound or thermoset, etc. As best shown in FIG. 3, each of the insulating plates 190a-d has a first major surface, an opposing second major surface, a generally rectangular cross-section, and a generally rectangular top profile. For the same reasons discussed above in reference to the connector plates 160a,b, 170a,b, and 180a,b, none of the insulating plates 190a-d includes an aperture in a central area of the connector plate. Put another way, each of the insulating plates 190a-d lacks an aperture in the central area of the insulating plate. As discussed herein, each of the insulating plates 190a-d can include one or more apertures in a perimeter or external area (e.g., outside of the central area of the insulating plates) for receiving the spacer alignment rods 200a,b therethrough.

The pairs of connector plates 160, 170, 180 and the insulating plates 190a-d are held in a spaced-apart fashion, as best shown in FIG. 4, by respective pairs of the phase spacers 195a-c. Thus, when the phase-conductors 25a-c and 26a-c of the busway sections 20a,b are not coupled to the joint pack 100, the pairs of phase spacers 195a-c maintain a minimum space or distance between the first and the second connector plates for each corresponding phase (e.g., phase A, B, C) and between adjacent insulating plates. Specifically, the first pair of phase spacers 195a separates the first connector plate 160a from the second connector plate 160b of the first pair of connector plates 160 and the first insulating plate 190a from the second insulating plate 190b, while maintaining a space for slidably engaging therebetween a phase-conductor (e.g., phase-conductors 25a and 26a). Similarly, the second pair of phase spacers 195b separates the first connector plate 170a from the second connector plate 170b of the second pair of connector plates 170 and the second insulating plate 190b from the third insulating plate 190c, while maintaining a space for slidably engaging therebetween a phase-conductor (e.g., phase-conductors 25b and 26b); and the third pair of phase spacers 195c separates the first connector plate 180a from the second connector plate 180b of the third pair of connector plates 180 and the third insulating plate 190c from the fourth insulating plate 190d, while maintaining a space for slidably engaging therebetween a phase-conductor (e.g., phase-conductors 25c and 26c).

As best shown in FIG. 4, each of the phase spacers 195a-c includes a bore (not labeled) for receiving a corresponding one of the spacer alignment rods 200a,b therethrough. The bores of the phase spacers 195a-c aid in aligning and positioning the phase spacers 195a-c properly within the joint pack 100 such that the phase spacers 195a-c maintain a space or gap between the pairs of connector plates 160, 170, and 180 when no phase-conductors are present or coupled to the joint pack 100. Maintaining such gaps aids in connecting the busway sections 20a,b to the joint pack 100 (e.g., the gaps provide a space for the phase-conductors 25a-c and 26a-c to enter the ends 100a,b of the joint pack 100).

Each of the pairs of phase spacers 195a-c is positioned along opposing ends of respective pairs of connector plates 160, 170, 180. Specifically, one of the first pair of phase spacers 195a is positioned adjacent to the first side 100c of the joint pack 100 and at a first end of the first pair of connector plates 160 and the other of the first pair of phase spacers 195a is positioned adjacent to the second side 100d of the joint pack 100 and at a second end of the first pair of connector plates 160, best shown in FIG. 4. Similarly, one of the second pair of phase spacers 195b is positioned adjacent to the first side 100c of the joint pack 100 and at a first end of the second pair of connector plates 170 and the other of the second pair of phase spacers 195b is positioned adjacent to the second side 100d of the joint pack 100 and at a second end of the second pair of connector plates 170; and one of the third pair of phase spacers 195c is positioned adjacent to the first side 100c of the joint pack 100 and at a first end of the third pair of connector plates 180 and the other of the third pair of phase spacers 195c is positioned adjacent to the second side 100d of the joint pack 100 and at a second end of the third pair of connector plates 180.

In some implementations, each of the phase spacer 195a-c is positioned within the joint pack 100 such that when the busway sections 20a,b are not engaging the joint pack 100 (e.g., the joint pack 100 is not installed in a busway system), each of the phase spacers 195a-c is positioned to abut a portion of a perimeter edge of one or both of the connector plates for a given pair of connector plates. Put another way, each of the phase spacers 195a-c is positioned to intersect a plane including a portion of a perimeter edge of both of the connector plates for a given pair of connector plates. In such implementations, the portions of the perimeter edges of both of the connector plates for a given pair of connector plates are parallel. For example, as shown in FIG. 4, each of the first pair of phase spacers 195a abuts a portion of a perimeter edge of both the first and the second connector plates 160a,b of the first pair of connector plates 160. Similarly, for example, as shown in FIG. 4, each of the second pair of phase spacers 195b abuts a portion of a perimeter edge of both the first and the second connector plates 170a,b of the second pair of connector plates 170 and each of the third pair of phase spacers 195c abuts a portion of a perimeter edge of both the first and the second connector plates 180a,b of the third pair of connector plates 180. As shown, the spacers 195a-c maintain a minimum space or gap between the pairs of connector plates 160, 170, and 180 when no phase-conductors are present or coupled to the joint pack 100, which aids in the installation of the busway joint pack 100 in a busway system.

Assembly of the joint pack 100 includes arranging the various components of the joint pack 100, as best shown in FIG. 3, and attaching the components with the spacer alignment rods 200a,b and the latch mechanisms 150a,b. The components are arranged and/or stacked in the following order from the upper pressure plate 110a through the lower pressure plate 110b of the joint pack 100: the upper pressure plate 110a, the lid 120a, the first grounding plate 125a, the first insulating plate 190a, the first connector plate 160a of the first pair of connector plates 160, the first pair of phase spacers 195a, the second connector plate 160b of the first pair of connector plates 160, the second insulating plate 190b, the first connector plate 170a of the second pair of connector plates 170, the second pair of phase spacers 195b, the second connector plate 170b of the second pair of connector plates 170, the third insulating plate 190c, the first connector plate 180a of the third pair of connector plates 180, the third pair of phase spacers 195c, the second connector plate 180b of the third pair of connector plates 180, the fourth insulating plate 190d, the second grounding plate 125b, the base 120b, and the lower pressure plate 110b.

After the components of the joint pack are stacked as outlined above, according to some implementations of assembling the joint pack 100, the spacer alignment rods 200a,b are inserted through respective apertures in the base 120b, then respective apertures in the insulating plates 190a-d and the bores in the phase spacers 195a-c, and then respective apertures in the lid 120a to loosely secure the components together, thereby defining the respective spaces between each of the pairs of connector plates 160, 170, and 180. Further, the latch mechanisms 150a,b are coupled to the latch-engaging portions 112a,b and 113a,b of the upper and lower pressure plates 110a,b. The latch mechanisms 150a,b can be closed or tightened (FIG. 2B) to firmly hold the pressure plates 110a,b on the assembled joint pack 100.

While spacer alignment rods 200a,b are shown and described as aiding in holding several of the components of the joint pack 100 loosely together, various other fasteners can be used in the same, or similar manner. For example, nails, screws, cable-ties, nuts and bolts might be used in place of the spacer alignment rods 200a,b. In some implementations, no fasteners (e.g., spacer alignment rods 200a,b) are included in the joint pack 100 other than the latch mechanisms 150a,b. In such implementations, the various components of the joint pack are only held together by the latch mechanisms 150a,b.

While two spacer alignment rods 200a,b are shown and described as aiding in holding several of the components of the joint pack 100 loosely together, in an alternative implementation, one spacer alignment rod (e.g., not two spacer alignment rods) can be used to aid in holding several of the components of the joint pack 100 loosely together. The one spacer alignment rod implementation (not shown) could include the one spacer alignment rod having a non-round cross section to aid in preventing relative rotation of the several components of the alternative joint pack about the one spacer alignment rod. That is, the non-round cross section of the non-round spacer alignment rod prevents the components attached via the one spacer alignment rod from rotating about the one spacer alignment rod. Furthermore, the two spacer alignment rods 200a,b described herein can have round cross sections, non-round cross sections, or a combination thereof.

While the joint pack 100 is shown as including two latch mechanisms 150a,b, the joint pack 100 can include only one latch mechanism (not shown). In such an alternative implementation, one of the sides 100c,d of the joint pack can include the latch mechanism 150a and the other of the sides 100c,d of the joint pack can include a hinge (not shown) attached between the pressure plates 110a,b.

While the joint pack 100 is shown as including two latch mechanisms 150a,b that are actuated separately (e.g., the first latch mechanism 150a can be opened and/or closed independently of the second latch mechanism 150b), the joint pack 100 can include an actuating mechanism (not shown) linking the two latch mechanisms 150a,b such that the latch mechanisms 150a,b are actuatable in unison (e.g., together). In such an alternative implementation, the switching of the first latch mechanism 150a from the open position to its closed position would automatically result in the second latch mechanism 150b being switched from the open position to its closed position via, for example, the actuating mechanism (not shown). The actuating mechanism can be a bridge or bar like structure that rigidly attaches the first latch mechanism 150a to the second latch mechanism 150b in one or more points.

While the joint pack 100 is shown as including the latch mechanisms 150a,b to clamp the joint pack 100 onto the two busway sections 20a,b, any type of fasteners—instead of the latch mechanisms 150a,b—can be coupled to the pressure plates 110a,b and tightened to couple the two busway sections 20a,b. For example, nuts and bolts (not shown) can be used in place of the latch mechanisms 150a,b. In such alternative implementations, the bolts would not pass through the central areas of the pairs of connector plates 160, 170, 180; but would rather be adjacent to the sides 100c,d of the joint pack. By placing bolts adjacent to the sides 100c,d (as opposed to placing the bolts adjacent to the first and the second ends 100a,b), the bolts do not need to pass through apertures in the phase conductors of the busway sections (not shown), which can result in larger phase conductors (e.g., more copper). Further, in such alternative implementations, the pressure plates 110a,b can be modified (e.g., the latch-engaging portions 112a,b and 113a,b can be modified) to accommodate the different type of fastener(s).

While the busway sections 20a,b are shown as being three-pole busways in FIG. 1, in some alternative implementations, the busway sections can be four-pole busways. In such alternative implementations, each of the busway sections includes three phase-conductors and one neutral-conductor (not shown).

Compared with conventional joint packs that have a bolt passing through the center of the joint pack, the joint pack 100 according to the inventive aspects disclosed herein can use less material in the conductor plates, allowing an overall thickness dimension of the joint pack 100 to be reduced compared to conventional joint packs without compromising the thermal performance of the joint pack 100. Moreover, the absence of a central bolt allows air to move more freely between the pairs of connector plates 160, 170, and 108 in the joint pack 100 out of the sides thereof, which facilitates the transfer of thermal energy by convection or radiation away from the joint pack 100.

Compared with conventional joint packs that have a bolt passing through the center of the joint pack for tightening the joint pack in a busway system, the joint pack 100 including the latch mechanisms 150a,b is less susceptible to loosening over time due to thermal cycling. That is, the latch mechanisms 150a,b can be designed and/or calibrated to apply a compressive force on the various plates of the joint pack 100 that resists changing due to thermal cycling.

In some implementations, each of the phase spacer 195a-c is positioned within the joint pack 100 such that when the busway sections 20a,b are not engaging the joint pack 100 (e.g., the joint pack 100 is not installed in a busway system), each of the phase spacers 195a-c is positioned to physically contact and/or touch a portion of a perimeter edge of one or both of the connector plates for a given pair of connector plates. In some other implementations, each of the phase spacer 195a-c is positioned within the joint pack 100 such that when the busway sections 20a,b are not engaging the joint pack 100 (e.g., the joint pack 100 is not installed in a busway system), each of the phase spacers 195a-c is positioned to be adjacent to or slightly spaced from (e.g., 1 mil, 100 mils, etc.) a portion of a perimeter edge of one or both of the connector plates for a given pair of connector plates. As described herein, such spacers 195a-c maintain a minimum space or gap between the pairs of connector plates 160, 170, and 180 when no phase-conductors are present or coupled to the joint pack 100, which aids in the installation of the busway joint pack 100 in a busway system. The spacers 195a-c are positioned to be adjacent to the perimeter edges of the connector plates 160, 170, and 180, as opposed to the central areas, to free up space for the phase conductors 25a-c and 26a-c, which can result in an overall smaller busway joint pack as compared to prior art joint packs with spacers in the central areas of the connector plates around a bolt fastener.

While some of the above implementations describe the connector plates 160a,b, 170a,b, and 180a,b as lacking an aperture in a central area of the connector plate, in some implementations, each of the connector plates 160a,b, 170a,b, and 180a,b lacks any aperture in any area of the connector plate.

While the latch mechanisms 150a,b of the present disclosure are shown and described as being included in the busway joint pack 100 for use in coupling two busway sections in a busway system, the disclosed latch mechanisms 150a,b might also be used in a switchgear cabinet for coupling the bus structures therein in place of, or in addition to, a bolted system of connectors. Such switchgear cabinets can utilize latch mechanisms closed in the same, or similar, fashion as in the disclosed busway joint pack and offer similar advantages in the switchgear cabinet.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A busway joint pack, comprising:
a first latch mechanism having an open position and a closed position;
a second latch mechanism having an open position and a closed position;
a first connector plate having a first major surface opposing a second major surface; and
a second connector plate having a first major surface opposing a second major surface, the second connector plate being spaced from the first connector plate such that the first and the second connector plates are configured to engage a pair of phase conductors of a pair of busway sections in a clamping fashion in response to the first latch mechanism being in the closed position and the second latch mechanism being in the closed position.

2. The busway joint pack of claim 1, wherein the busway joint pack is a three-phase busway joint pack and the pair of busway sections is a pair of three-phase busway sections, the three-phase busway joint pack being configured to electrically couple a first one of the three-phase busway sections with a second one of the three-phase busway sections.

3. The busway joint pack of claim 1, further comprising:
a first pressure plate positioned at a top side of the busway joint pack; and
a second pressure plate positioned at a bottom side of the busway joint pack,
the first and the second latch mechanisms being operatively coupled to the first and the second pressure plates such that in response to the first and the second latch mechanisms being in the closed positions, the first pressure plate exerts a first force on the first connector plate in a first direction and the second pressure plate exerts a second force on the second connector plate in a second direction.

4. The busway joint pack of claim 3, wherein the first direction is opposite the second direction.

5. The busway joint pack claim 1, further comprising a spacer positioned adjacent to a first side of the busway joint pack and at least partially between the first connector plate and the second connector plate, the spacer aiding in providing a space between the first and the second connector plates.

6. The busway joint pack of claim 5, wherein the spacer abuts a portion of a perimeter edge of the first connector plate, a portion of a perimeter edge of the second connector plate, or both in response to the first and the second connector plates not engaging the pair of phase conductors.

7. The busway joint pack of claim 5, wherein the busway joint pack is configured to maintain a coupled relationship between the first and the second connector plates and the spacer in response to the busway joint pack not being installed in a busway system.

8. The busway joint pack of claim 1, further comprising:
a first insulating plate positioned adjacent to the first major surface of the first connector plate; and
a second insulating plate positioned adjacent to the second major surface of the second connector plate.

9. The busway joint pack of claim 8, wherein the first latch mechanism is adjacent to a first side of the busway joint pack and the second latch mechanism is adjacent to an opposing second side of the busway joint pack.

10. The busway joint pack of claim 9, further comprising:
a first spacer positioned adjacent to the first side of the busway joint pack and at least partially between the second major surface of the first connector plate and the first major surface of the second connector plate; and
a second spacer positioned adjacent to the second side of the busway joint pack and at least partially between the second major surface of the first connector plate and the first major surface of the second connector plate,
the first and the second spacers aiding in providing the space between the first and the second connector plates.

11. The busway joint pack of claim 10, further comprising:
a first spacer alignment rod positioned through a bore in the first spacer and corresponding first apertures in the first and the second insulating plates adjacent to the first side of the busway joint pack; and
a second spacer alignment rod positioned through a bore in the second spacer and corresponding second apertures in the first and the second insulating plates adjacent to the second side of the busway joint pack,
the first and the second spacer alignment rods aiding in maintaining the space between the first and the second connector plates in response to the first latch mechanism being in the open position, the second latch mechanism being in the open position, or both.

12. The busway joint pack of claim 9, further comprising:
a first pressure plate including a first latch-engaging portion adjacent to the first side of the busway joint pack and a second latch-engaging portion adjacent to the second side of the busway joint pack, the first pressure plate being positioned adjacent to the first insulating plate; and a second pressure plate including a first latch-engaging portion adjacent to the first side of the busway joint pack and a second latch-engaging portion adjacent to the second side of the busway joint pack, the second pressure plate being positioned adjacent to the second insulating plate, the first latch mechanism being configured to be coupled to the first latch-engaging portion of the first pressure plate and the first latch-engaging portion of the second pressure plate, the second latch mechanism being configured to be coupled to the second latch-engaging portion of the first pressure plate and the second latch-engaging portion of the second pressure plate.

13. The busway joint pack of claim 12, wherein in response to the first latch mechanism being moved from the open position to the closed position, the first latch-engaging portion of the first pressure plate and the first latch-engaging portion of the second pressure plate are drawn closer together, and wherein in response to the second latch mechanism being moved from the open position to the closed position, the second latch-engaging portion of the first pressure plate and the second latch-engaging portion of the second pressure plate are drawn closer together.

14. A busway system, comprising:
a first busway section;
a second busway section; and
a busway joint pack positioned between the first and the second busway sections and being configured to operatively couple the first busway section to the second busway section, the busway joint pack including:
a first connector plate having a first major surface opposing a second major surface, the first connector plate lacking an aperture in a central area of the first connector plate;
a second connector plate having a first major surface opposing a second major surface, the second connector plate lacking an aperture in a central area of the second connector plate, the second connector plate being spaced from the first connector plate such that the second major surface of the first connector plate and the first major surface of the second connector plate are configured to directly engage a first phase-conductor of the first busway section and a second phase conductor of the second busway section;
a first insulating plate positioned adjacent to the first major surface of the first connector plate;
a second insulating plate positioned adjacent to the second major surface of the second connector plate; and
a spacer positioned adjacent to a side of the busway joint pack and at least partially between the first and the second connector plates to aid in providing the space between the first and the second connector plates, the spacer being configured to abut a portion of a perimeter edge of the first connector plate, a portion of a perimeter edge of the second connector plate, or both in response to the busway joint pack not being coupled to the first and the second busway sections.

15. The busway system of claim 14, wherein the busway joint pack lacks a fastener positioned through the central areas of the first and the second connector plates.

16. The busway system of claim 14, wherein the first and the second major surfaces of the first and the second connector plates are continuous in the central area of the first and the second connector plates.

17. The busway system of claim 14, wherein the central area of the first and the second connector plates has a constant cross-sectional area.

18. The busway system of claim 14, wherein the first and the second major surfaces of the first and the second connector plates are substantially planar.

19. The busway system of claim 14, wherein the spacer is further positioned at least partially between the first and the second insulating plates to aid in providing a space between the first and the second insulating plates.

20. The busway system of claim 14, wherein the busway joint pack is configured to maintain a coupled relationship between the first and the second connector plates, the first and the second insulating plates, and the spacer in response to the busway joint pack not being coupled to the first and the second busway sections.

21. The busway system of claim 14, further comprising a latch mechanism having an open position and a closed position, wherein the first and the second connector plates are configured to engage the first and the second phase conductors of the first and the second busway sections in a clamping fashion in response to the latch mechanism being in the closed position.

22. An apparatus for connecting two lengths of bus conductors comprising:
a first latch mechanism having an open position and a closed position;
a second latch mechanism having an open position and a closed position;
a first connector plate having a first major surface opposing a second major surface; and
a second connector plate having a first major surface opposing a second major surface, the second connector plate being spaced from the first connector plate such that the first and the second connector plates are configured to engage a pair of phase conductors of a pair of bus conductors in a clamping fashion in response to the first latch mechanism being in the closed position and the second latch mechanism being in the closed position.

23. The apparatus for connecting two lengths of bus conductors according to claim 22, wherein the bus conductors are contained in busway sections.

24. The apparatus for connecting two lengths of bus conductors according to claim 22, wherein the bus conductors are contained in a switchgear cabinet.

* * * * *